Feb. 22, 1944.   I. F. MANDELL   2,342,417
PROJECTOR FOR CINEMATOGRAPHIC TARGETS
Filed April 22, 1941   2 Sheets-Sheet 1
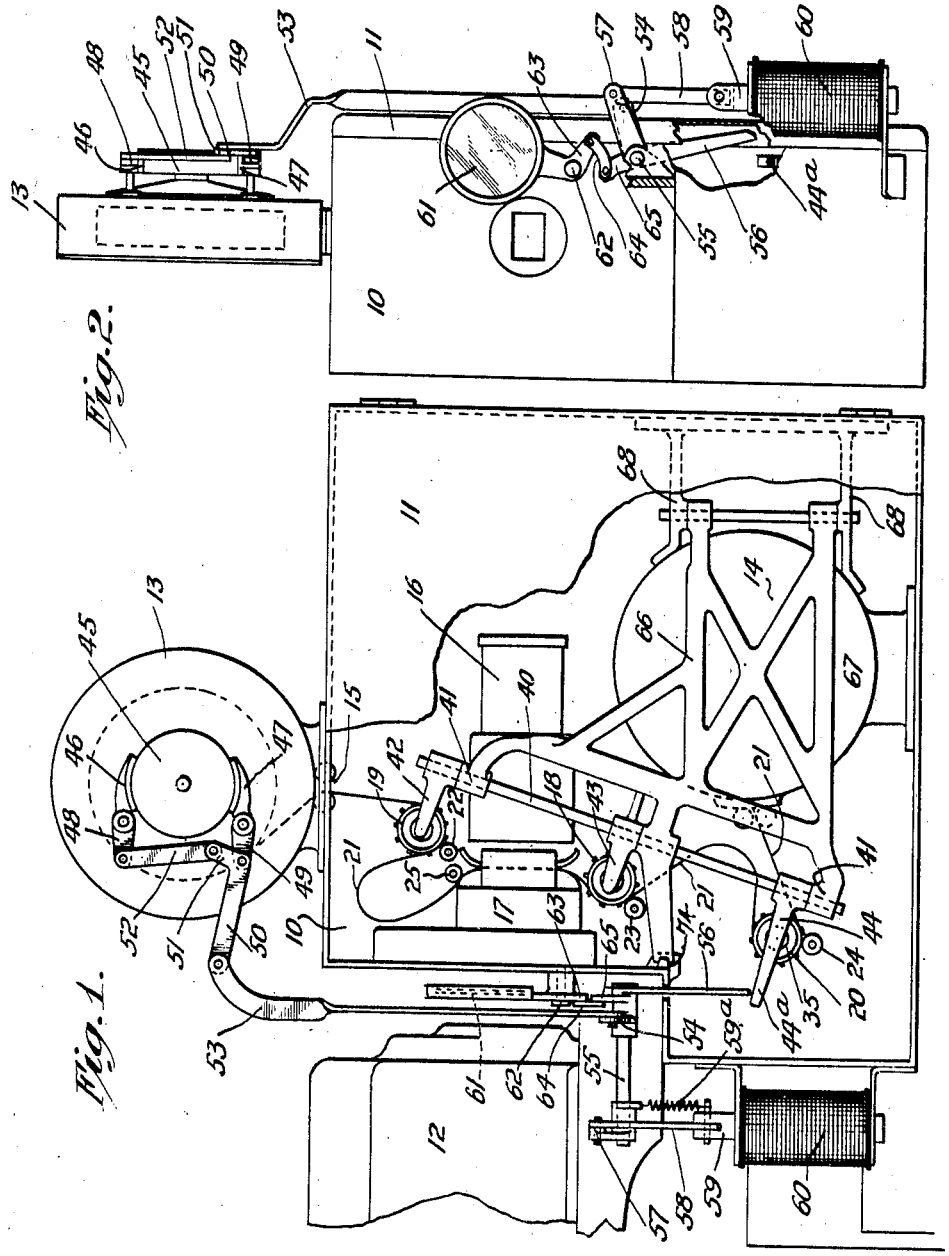
Irving F. Mandell
INVENTOR
Frank T. Wentworth
ATTORNEY.

Feb. 22, 1944.  I. F. MANDELL  2,342,417
PROJECTOR FOR CINEMATOGRAPHIC TARGETS
Filed April 22, 1941  2 Sheets-Sheet 2
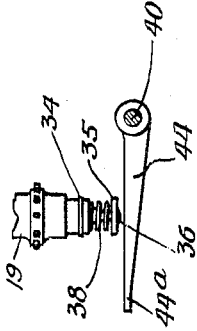
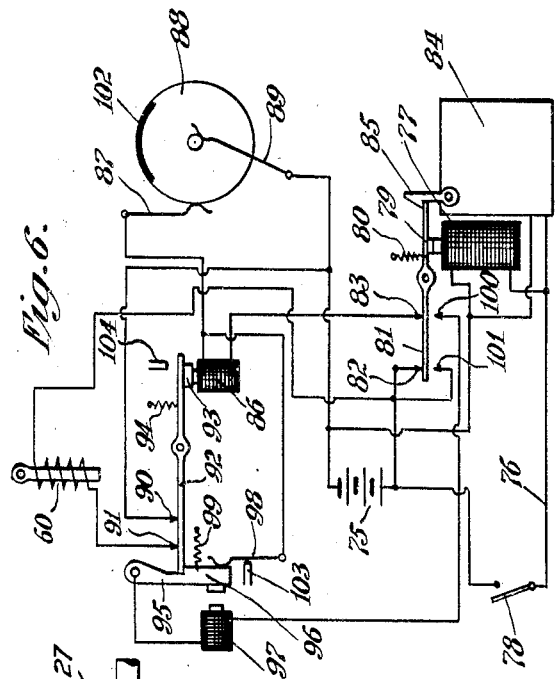
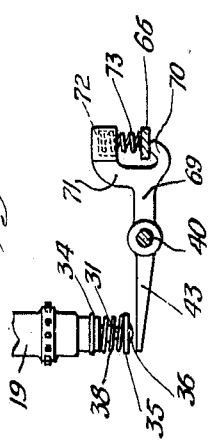
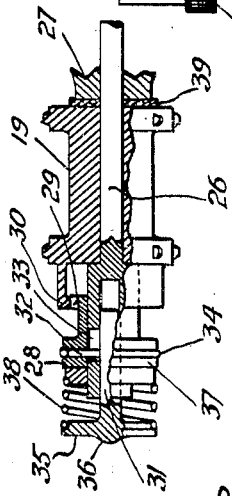
Irving F. Mandell
INVENTOR
Frank P. Wentworth
ATTORNEY.

Patented Feb. 22, 1944

2,342,417

UNITED STATES PATENT OFFICE 2,342,417

PROJECTOR FOR CINEMATOGRAPHIC TARGETS

Irving F. Mandell, New Brunswick, N. J., assignor to Lydia B. Koch, New York, N. Y.

Application April 22, 1941, Serial No. 389,789

12 Claims. (Cl. 273—105.1)

The invention relates to projectors for cinematographic targets, and more particularly to a projector embodying therein mechanisms and controls therefor by which the feeding of the film will be stopped with sufficient rapidity to avoid any substantial change in the projected image and prevent a resumption of the feed of the film for a timed interval so as to permit marking of the accuracy of the fire and the eradication of the means upon the screen showing the point of passage of a bullet therethrough.

In the operation of cinematographic targets, a moving picture is projected upon a screen consisting of several parallel plies of a paper web continuously traveling at a uniform, slow speed, and having positioned in back of same a source of light so that when the target is punctured by a bullet or other missile, the light rays passing through the screen will, in relation to an image upon the screen, permit marking of the accuracy of fire.

In order to properly mark the accuracy of the fire, it is essential that the moving image upon the screen be converted into a still image for a time interval sufficient to permit the marking.

With the use of an electrically driven projector which must be positioned at a considerable distance from the screen, the operation of the projector must be by a remote electrical control device actuated by the target structure as a result of the impact of a bullet with some part thereof, and the structural arrangement must be such as to cause the stoppage of the projection of a moving image upon the screen substantially simultaneously with the impact of a bullet with the screen.

Heretofore it has been attempted to secure this result by merely interrupting the circuit including the motor and providing a timing device controlling the interval during which such interruption continues.

By the means heretofore employed, there were several factors making the operation of the device unreliable, due to conditions inherent to the operation of a projector.

While, with the human eye, there is no sense of the feeding movement of a film, a considerable part of the time, the film, and consequently the image projected against the screen, is in motion, and this is true notwithstanding various well known appliances employed to conceal any sense of motion except in the changing position of parts in the projected image.

In a motor driven projector there is sufficient weight of moving parts in the motor and the mechanisms driven thereby to cause the moving inertia of parts, after the interruption of the circuit to the motor, to impart some feeding movement to the film, which may result in the film being out of the frame when the feeding movement thereof ceases, which of course would preclude any reliability in rating marksmanship.

Another difficulty arising from the rapid intermittent movement of a film is that, notwithstanding that the circuit, by means of which stoppage of the feeding of the film is controlled, is either opened or closed as a result of impact of a bullet with some part of the target, this may occur while the film is in motion, and consequently while a picture is not in the frame. This also will interfere with accuracy in marking.

Owing to persistence of vision, a marksman may fire at an image which appears to be upon a screen at the instant, but which could not be in the position at which it appears to be because at that instant the film is actually being fed, which condition, if the feeding of the film were stopped instantly with the impact of a bullet with some part of the target structure, would mean that the light passing through the opening in the screen will not even indicate approximately the accuracy of the firing in relation to the apparently still image.

With the above conditions in mind, the present invention consists in the provision, in a cinematographic projector, of means whereby the projector may be stopped while a film is properly framed and the effects of moving inertia of actuating mechanisms in the projector, after the interruption of the application of power to the film feeding mechanism, may be avoided. In this manner, possible overrunning of the film upon the actuation of the electrical control mechanism is prevented, and the motor for supplying power for actuating the film feeding mechanism may be continuously operated even while there is no feeding of the film.

Notwithstanding that the control circuit is either opened or closed substantially simultaneously with the impact of a bullet with the screen, the construction and arrangement of the various parts for stopping the feed of the film is such that this mechanism will not become operative until a film is properly positioned to secure accurate framing of the film and the picture. The circuit control mechanism at the target serves merely to initiate the operation of other mechanisms the functioning of which is determined by the position of the film in relation to the framing mechanism of the projector.

The control mechanism also includes therein a circuit controlling mechanism independent of the means for interrupting movement of the film so as to continue the operation of this mechanism during a time interval sufficient to permit marking of the accuracy of fire.

The structure of the invention also includes therein means whereby simultaneously with the actuation of the mechanism for stopping the feed of the film, a light filter screen will be interposed between the lamp and the film so as to prevent possible ignition of the film due to the concentration of the heat of light rays upon a portion of the film while said film is at rest, such means being actuated from the same source of power as the mechanisms for causing stoppage of the film.

By providing a mechanism in which all of the parts for stopping the feeding of the film and protecting the film from the light rays are actuated from the same source of power, the circuit to which is controlled by initiating and sustaining circuit control devices, accuracy in the timing of these various devices or mechanisms in relation to each other is assured.

Simplicity in the various mechanisms and circuit controls employed is possible with a structure embodying the invention, thus minimizing the difficulties of maintenance of a target structure embodying the invention.

The invention consists primarily in a projector for cinematographic targets embodying therein a film feeding mechanism including therein a driving shaft, means idly mounted in relation to said shaft, a driven member carried by and rotatable with said shaft, means thereon adapted to engage and impart feeding movement to a film, a clutch mechanism whereby said idly mounted means may be connected with, or disconnected from, said driving shaft, means operative upon said clutch mechanism, electrically actuated means operative upon said last named means, circuit controlling means whereby said electrically actuated means may be energized and de-energized, and a remote electrical control mechanism temporarily supplying current to said circuit controlling means; and in such other novel features of construction and combination of parts as are hereinafter set forth and described, and more particularly pointed out in the claims hereto appended.

Referring to the drawings,

Fig. 1 is a side view of a projector embodying the invention with the cover of the main projector casing broken away and the lamp housing shown only in part;

Fig. 2 is a vertical section upon the line 2—2 of Fig. 1;

Fig. 3 is a detail view of part of the means operative upon the clutch mechanism;

Fig. 4 is a similar view of another part of said means;

Fig. 5 is a detail view, partly in longitudinal section, of a portion of the intermittently operative driving shaft and the driven member carried thereby; and Fig. 6 is a schematic view of the circuits and their control switches.

Like numerals refer to like parts throughout the several views.

In the embodiment of the invention shown in the accompanying drawings, the housing for the film feeding mechanism is shown at 10 and its hinged cover at 11. The lamp housing is shown at 12. Surmounting the housing 10 is the usual casing 13 for the supply reel, and within said housing is the usual casing 14 for the rewind reel. The usual fire gate is shown at 15.

The projector lens 16 is located within the housing 10 and has associated therewith the usual framing housing 17.

The construction and arrangement of the foregoing parts is old and well known in this art, the present invention relating more particularly to those details by which the feeding of the film may be automatically stopped and re-started as a result of the functioning of a remote control mechanism.

As shown in the drawings, the intermittent movement of the film is effected by means of a feed sprocket 18 positioned below the gate opening 15 and two guide sprockets 19 and 20, the former positioned above and the latter below, said feed sprocket.

The mechanism for actuating these sprockets 18, 19 and 20 is that now commonly used with electric motor driven projectors. Since this mechanism is old and well known in this art, it is not shown in the accompanying drawings, except insofar as certain details thereof have been modified to control the application of the power delivered through said mechanism, as determined by the operation of the remote controlled devices, in stopping and starting the feeding of the film and producing a dwell while the film is at rest, in a manner to be hereinafter referred to.

In the accompanying drawings, the film itself is indicated at 21.

Associated with the sprockets 18, 19 and 20 are the usual retaining rollers 22, 23 and 24, and adjacent the gate housing 17 is a guide roller 25.

While the projector of the invention is particularly adapted for use in connection with a cinematographic target in which the remote control mechanism is automatically actuated as a result of the impact of a bullet with this target, it is obvious that it may be used in conjunction with illustrated lectures and under other conditions wherein it is desired to convert the moving image upon a screen to a still image for a limited period.

The functioning of the projector is the same, irrespective of the nature of the means actuating the remote control device.

In a projector embodying the invention, particularly when it is used in connection with a cinematographic target, the circuit in the remote control device is either opened or closed momentarily only to cause the stoppage of the projector, according to whether the various contacts of the target are connected in series or in parallel.

Before describing the specific mechanisms and devices effecting the stoping and re-starting of the projector, the sequence of operations incidental to such functioning must be clearly understood. It is as follows:

The remote control mechanism includes a circuit having therein a relay controlling a local circuit for causing the actuation of the various mechanisms in the projector for stopping the feed of the film. The power derived from the local circuit may or may not be applied simultaneously with the actuation of the relay in the remote control circuit, since at the instant of the energizing of the relay, the film may be having movement so that it is not properly framed.

and hence the picture upon the screen will not be converted into a still picture.

It is therefore necessary to provide in the mechanism, a timing switch which will close a local circuit and thus energize the actuating means for the various devices to stop the feed of the film, instantly with the stoppage of the film following a normal feeding movement and framing of the film. The relay in the remote control circuit, however, is energized only momentarily, and since the contacts of the relay are in the local control circuit, the feeding of the film would be instantly resumed with the de-energizing of the relay magnet, if a sustaining switch mechanism were not provided to close the local circuit around the relay for a limited time interval.

It is also necessary to provide means operative upon the relay armature which will retard the movement of this armature for a time interval sufficient to allow for the maximum film movement necessary to properly frame a picture.

In the drawings, as shown more particularly in Fig. 5, each sprocket mechanism includes therein a driving shaft 26 mounted in a bearing 27 carried by one wall of the housing 10. A sprocket, such as 19, is idly mounted upon this shaft. Slidably mounted thereon towards the free end of the shaft, is a driven member 28 carrying clutch members 29 adapted to co-operate with clutch members 30 upon the sprocket 19. A positively acting toothed clutch mechanism is preferably used. The end of the shaft 26 upon which the driven clutch member 28 is mounted is, as shown in the drawings, hollow, and has an exterior angular surface to avoid the use of a spline connection between these parts.

Slidably mounted within the hollow end of the shaft 26 is a plunger 31 carrying a pin 32 passing through a slot 33 in said shaft and engaging the slidable driven member 28. A spring ring 34 is used to hold said pin 32 in place.

The plunger 31 is provided with an enlarged head 35 having a domed portion 36, and between this and a spring seat 37 is a spiral spring 38 which is normally under tension so as to engage the clutch teeth 29 upon the driven member with the clutch teeth 30 upon the sprocket.

Between one end of the sprocket and the bearing 27 is a friction washer 39.

By this construction, the film feeding mechanism may be connected with, or disconnected from, the driving shaft and the power operative thereon, the stoppage of the feed of the film resulting from the disconnection of said driven member from said driving member or shaft 26. With this arrangement, the sprocket wheel is relieved from the effects of moving inertia of the motor and the mechanisms applying power therefrom to the driving shaft 26.

Each of the feeding sprockets 18, 19 and 20 is constructed as above described.

Associated with the several feeding sprockets is means by which the clutch mechanisms imparting movement to the sprockets are simultaneously actuated to disconnect the several driven members from the sprockets. This mechanism comprises a rock shaft 40 mounted in bearings 41 and carrying three tappets 42, 43 and 44 projecting from said shaft into a position permitting their engagement with the domed portions 36 of the enlarged heads of the plungers 31 of the several sprocket wheel mechanisms.

By rocking the shaft 40 with a clockwise movement, the several plunger members 31, and therethrough the several driven members 28 are moved against the tension of the springs 38 toward the associated sprocket member to an extent to disengage the clutch members 29 and 30 and thus interrupt the application of power from the driving member 26 to the sprocket. The pin and slot connection 32 and 33 between the plunger and the driving member 26 permits this movement of the driven clutch member and limits movement of the driven member along the driving member by the spring 38.

Carried by the film reel in the casing 13 is a brake drum 45, and pivoted to one wall of said casing are brake arms 46 and 47, the shoes of which are respectively adapted to engage said brake drum. The brake arm 46 is provided with a heel 48, while the brake arm 47 is provided with a heel 49.

Pivotally connected with the heel 49 is a bell crank lever 50, the short arm 51 of which is pivotally connected by a link 52 with the heel 48 so as to form a toggle link connection between the two brake arms.

Pivoted to the rock arm of the bell crank lever 50 is a link 53, the other end of which is pivotally connected with a crank 54 upon a rocking shaft 55.

The shaft 55 also carries a crank 56 extending downwardly into operative relation with the extended end of the lowermost tappet 44.

Said shaft 55 has a crank arm 57 connected by a pitman 58 with the core 59 of a solenoid 60 included in a local circuit, for supplying the necessary power to effect stoppage of the film by the actuation of the various clutch mechanisms and the sprocket mechanisms heretofore described.

A restoring spring 59a is used to raise the core 59 of the solenoid when said solenoid is de-energized and thus impart a return movement of the shaft 55 and the various parts actuated therefrom.

The crank arm 56 is directed at an angle so as to be normally positioned slightly above the extended end 44a, although rocking movement of the shaft 55 will bring it into engagement with said extension so as to impart rocking movement of the shaft 40.

With films ordinarily used in cinematographic projectors, combustible material is employed, and in the event of the stoppage of the film, for any reason whatsoever, there is a fire hazard due to the action of the heat in the light rays passing through the condenser.

In projectors used in cinematographic targets, the interception of the infrared rays by the interposition of a color filter screen between the lamp housing and the film upon the stoppage of the feed of the film, is well known and is employed in the projector of the present invention. Such a screen is indicated at 61 in the drawings, and, as in such devices used heretofore, it is normally positioned at one side of the path of the light rays passing from the condenser.

As shown in the drawings, the color filter screen is mounted in a frame pivoted at 62, which frame, in the form of the invention shown, is in the form of a bell crank lever, one arm 63 of which is connected by a link 64 with a crank arm 65 upon the shaft 55.

By this construction, the actuation of the color filter screen is accurately timed in relation to the interruption of power to the sprockets, and the stoppage of the film as a result thereof, since all of the mechanisms operative to stop the film and actuate this filter are connected to a common member, the shaft 55, operated by a single source of power, the solenoid 60.

To facilitate the threading of the film through the feeding mechanism, the bearings 41 are mounted upon a frame 66 carrying a closure 67 for the rewind reel. Said frame is pivoted upon brackets 68 projecting inwardly of the forward wall of the housing 10, as shown in Fig. 1 of the drawings. The normal positioning of the crank arm 56, as described, is to permit such movement of the frame 66.

One of the tappets, as 43, is provided with a forked heel 69 straddling a bar of the frame 66. One arm 70 of said fork is adapted to engage the frame 66, and the other 71 is provided with a spring cup 72 for the spring 73 bearing against the other side of the frame.

The engagement of the arm 70 with the frame 66 by the spring 73 ensures the proper positioning of the various tappets 42, 43 and 44 in relation to the plunger head 35 of the several sprocket mechanisms.

While the several springs 38 act through the tappets to impart a return oscillation to the shaft 40 when the solenoid 60 is de-energized, said spring 73 is utilized to impart a slight additional movement to said shaft so as to avoid rubbing contact between the several tappets and the domes with which they are adapted respectively to engage.

Acting upon the frame 66 is a latch mechanism 74.

The winding of the solenoid 60 is contained in a local circuit derived from any desired source, indicated as a battery 75.

A remote control circuit 76 has therein a relay magnet 77 and a switch 78. The armature of the magnet 77 is carried by a rocking lever 79 having a restoring spring 80 and carrying a bridge contact 81 adapted to engage contacts 82 and 83 in the local circuit.

Associated with the relay magnet 77 is a timing device 84 having a latch member 85 adapted to engage the rocking lever 79 when the magnet 77 is energized.

The detailed mechanism of the timing device 84 is immaterial to the device, and may consist of a magnet connected in parallel with the magnet 77 for rocking the lever 79, and a dash pot acting upon the latch member 85 so as to hold the local circuit closed for a time interval sufficient to permit marking of the accuracy of fire.

The current for energizing the magnet 77 may be drawn from the source 75 or from an independent source, as desired.

The contact 82 is connected with one side of the source. The contact 83 is connected with a magnet 86, and also arranged in this circuit is a brush contact 87 engaging the electro-conductive portion 88 of a rotary switch member. A second brush contact 89 in contact with the portion 88 of said switch is connected with the other side of the source, as shown. The brush 89 is also connected with a fixed contact 90, and one terminal of the solenoid 60 is connected with a second contact 91, associated therewith. The other terminal of said solenoid is connected directly with the same side of the source as the contact 82.

Mounted adjacent the contacts 90 and 91 is a rocking lever 92, the armature 93 of which is acted upon by the magnet 86. A restoring spring 94 acts to normally bias said armature away from said magnet.

Mounted adjacent one end of the lever 92 is a latch member 95 carrying the armature 96 of an electro-magnet 97. The circuit to said magnet is completed through the latch member 95, a brush 98, the brush 87 of the rotary switch and through the portion 88 of the rotary contact and brush 89 to one side of the source. A spring 99 biases the latch member 95 toward the end of the lever 92 when the magnet 97 is de-energized.

The other terminal of the magnet 97 is connected with a fixed contact 100 having associated therewith a second fixed contact 101 connected with one side of the source 75. The bridge contact 81 is engaged with the contacts 100—101 by the spring 80 upon the disengagement of the timing latch 85 from said lever 79.

The rotary speed of the member 88 must be nicely synchronized with the operation of the film feeding mechanism, and said member 88 has upon the surface thereof, an arc of insulating material 102 of a length to close the circuit at said rotary switch during the feeding movement of a film.

A stop 103 limits movement of the brush 98 in one direction, and a stop 104 limits oscillatory movement of the lever 92 by the spring 94.

The switch 78 is one of a number of switches embodied in a cinematographic target apparatus and closed as a result of the impact of a bullet with the screen or other part of the target apparatus actuating said switch mechanism.

The circuit in which the rotary switch is located times the initial closing of the circuit to the solenoid 60 as a result of the energizing of the magnet 86 and the closing of the local circuit at the contacts 90 and 91 by the lever 92, and the solenoid, when the circuit is once closed, remains energized until the latch member 95 is disengaged from the lever 92 by the energizing of the magnet 97, due to the release of the lever 79 as a result of the disengagement of the latch member 85 therefrom. The timing mechanism 84 will, when the solenoid is once energized, prevent feeding of the film for a time interval sufficient not only to close the circuit including the rotary switch mechanism, but to permit marking of the accuracy of fire, even after the opening of the remote control circuit by the switch 78.

The operation of the hereinbefore described mechanism is substantially as follows:

Under normal conditions, the herein described mechanism operates as an ordinary cinematographic projector, so that an apparently moving image appears upon the screen as a result of the intermittent feeding movements of the film. There is, in fact, however, a short dwell between the exposure of succeeding pictures upon the film, and it is during such dwells that a moving image must be converted into a fixed image in order that the image may occupy approximately the same position upon the screen.

When the projector is used in connection with a cinematographic target structure, the film, when the projector is stopped, must be at rest and properly framed so as to permit a true indication of accuracy of the fire of a marksman. The speed at which the film moves is sufficiently great to produce in the image merely a sense of feeding movement, evidenced by "flicker" or "streaking," as modified by an anti-flicker shutter, rather than an actual visible feeding movement. Hence, the marksman, in firing at an image upon the target, can take no account of the feeding movement of the film, but must rely solely upon the indicated movement of the image due to the rapid projection of succeeding pictures upon the film.

When the switch mechanism 78 is closed as a result of the impact of a bullet with the target, the traction of the magnet upon the armature carried by the lever 79 rocks this lever so as to close a circuit across the contacts 82 and 83 of the local circuit. Unless the brush 87 is in contact with the electro-conductive part 88 of the rotary switch member, the solenoid 60 cannot be energized. The latch member 77 will engage said lever 79 when the circuit is closed across the contacts 82 and 83, and the timing mechanism 84 will maintain this contact, not only for a sufficient interval to permit movement of the rotary switch member so as to close the circuit at this switch, but will maintain this contact for a time sufficient to delay the re-starting of the film until after sufficient time has elapsed to permit marking of the accuracy of fire.

A picture in the film will be properly framed during the entire period that the brush 87 contacts with the part 88 of the rotary switch, so that the actuation of the solenoid 60 occurs simultaneously with the disengagement of said brush 87 from the insulating portion 102 and its engagement with the portion 88 of the rotary switch. Thereupon, a sustaining circuit is set up as a result of the energizing of the electromagnet 86 and the rocking of the lever 92 to close the circuit to the solenoid at the contacts 90 and 91.

When the magnet 97 is not energized, the latch 95 is moved by the spring 99 to the right, Fig. 6, to prevent return movement of the lever 92 by its spring 94 and thus prevent interruption of the circuit to the solenoid due to the alternate energizing and de-energizing of the magnet 86 by continued rotation of the movable member of the rotary switch.

Movement of said latch member 95 also closes a circuit including said latch member, the electromagnet 97 and the contacts 100—101, which circuit is around the rotary switch and is open at said contacts. This circuit will be set, but will remain open at said contacts until the latch member 85 is actuated to release the lever 79. Hence, the latch mechanisms 85 and 95, together, define the duration of the time interval during which an image will remain stationary. Instantly, with the release of the lever 79 by the latch member 85, the circuit including the solenoid will be interrupted by movement of the lever 92 by its spring 94, since movement of the lever 79 by its spring 80 will engage the bridge contact thereon with the contacts 100 and 101, thus energizing the magnet 97 and moving the latch member 95 out of operative engagement with the lever 92.

When the solenoid 60 is energized, the downward pull upon the core 59 rocks the shaft 55 through the pitman 58 of the crank 57. The movement of this shaft 55 simultaneously performs three operations. It actuates the rock shaft 40 to disconnect the various feed sprockets from their respective driving shafts; it applies braking power to the supply reel of film, and it moves the color filter screen into position between the condenser and the lamp house and the portion of the film exposed at the frame.

The three conditions above referred to continue so long as the local circuit is closed, but, with the reverse movement of the shaft 55 due to the upward movement of the solenoid core 59 by the spring 59a, the various feed sprockets are again connected with the driving shaft associated with each, the braking action upon the supply reel is relieved, and the color filter screen is moved to one side of the path of the light rays from the condenser.

The rocking of the shaft 40 with a clockwise movement results from the engagement of the crank arm 56 upon the shaft 55 with the extension 44a upon the tappet 44, this occurring immediately following the initial movement of the shaft. As the shaft 40 is rocked, each of the tappets 42, 43 and 44 is advanced into engagement with the domed end 36 of the head 35 of the plunger 31, and forces the plunger 31 and, through its pin 32, the slidable clutch member toward the associated sprocket 19, thus moving the clutch member 29 out of engagement with the clutch member 30 so as to disconnect the driving and driven members and thus stop the transmission of power to the sprocket. This is done against the tension of the spring 38. The resistance to the disengagement of the clutch members 29 and 30 will force the sprocket toward the friction washer 39 so as to prevent overrunning of the sprocket, or overcome that very slight moving inertia acting thereon. So long as the solenoid 60 remains energized, this relation of parts will be maintained.

The movement of the shaft 55 will also exert a downward pull upon the link 53, thus rocking the bell crank lever 50, the short arm 51 and the link 52, acting as a toggle lever, to force the brake arms 46 and 47 toward the brake drum 45 so as to develop a rapid braking action upon the supply reel within the casing 13, simultaneously with the stoppage of the feeding of the film by the sprocket mechanism. The movement of the color filter screen 61 is by a crank lever and link movement, which is obvious from the foregoing description.

The switch mechanism 78 is open during normal operation of the projector, the magnet 77 is de-energized and the bridge contact 81 is disengaged from the fixed contacts 82 and 83 and engaged with the contacts 100 and 101, so that the magnet 97 is energized and the latch member 95 is moved out of the operative relation to the lever 92. The starting circuit controlled by the rotary switch mechanism, notwithstanding the continued rotation of the members 88 and 102, cannot be closed so long as the member 81 is disengaged from the contacts 82 and 83.

It will be noted that the local circuit has three branches: one, the starting circuit including the electro-magnet 86 and the rotary switch mechanism; another, the sustaining circuit including said magnet, said rotary switch mechanism, the contacts 90 and 91, the lever 92 and the solenoid 60, and a third, the re-starting circuit, including the contacts 100—101, the magnet 97, the latch member 95, the brush 98 and the rotary switch mechanism.

The movement of the shaft 40 is against the tension of the spring 73, which permits that short movement of the rock shaft 40 necessary to disengage the coupling members 29 and 30, and limits the contra-clockwise movement of this shaft.

The arm 70, by engagement with a part of the frame 66, limits the contra-clockwise movement of the shaft 40, and the spring 73 will not only engage said arm 70 with said frame, but will impart movement to the rock shaft, in addition to its movement by the various springs 38, so as to move the various tappet arms out of engagement with the domed portion 36 of the heads of the various plungers 31.

The remote control circuit is momentarily closed instantly that a bullet strikes the screen. The solenoid 60 is energized either instantly, or upon the conclusion of the current feeding movement of the film. The timing device keeps the local circuit closed for a predetermined interval following which the magnet 97 is energized to re-start the feeding of the film, according to the position of the rotary switch mechanism at the moment. Intermittent energizing of the magnet 86 while the solenoid 60 is energized, does not interfere with this sequence.

The time intervals involved in the operation of the herein described mechanism are so short that there will be no substantial change in the position of the moving image, even though the marking is done upon an image of a picture upon the film following that appearing on the film at the time of the discharge of the firearm.

No great nicety is required in this respect because of the number of pictures involved and the very small movement of the image upon the screen. It is essential, however, that the solenoid shall be energized for converting a moving image into a fixed image while the feeding mechanism is at rest and some picture is properly framed.

In the accompanying drawings I have shown, and have herein described, electro-receptive devices 60—77—86—97 as being a solenoid having a movable core and electro-magnets having pivoted armatures, but other means for electrically actuating the shaft 55 and closing the local circuit may be employed in lieu of such specific forms of devices.

It is not my intention to limit the invention to the precise details of construction shown in the accompanying drawings, it being obvious that such are capable of wide variation without departing from the spirit and scope of the invention.

Having described the invention, what I claim as new and desire to have protected by Letters Patent, is:

1. A projector for cinematographic targets embodying therein a film feeding mechanism including a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, a reciprocatory member carried by each of said driving shafts, connections between each reciprocatory member and the driven member mounted upon the driving shaft, a rock shaft, tappets thereon engageable with said reciprocatory members respectively, a spring acting upon each driven member and its associated reciprocatory member biased to engage said clutch members, a second rock shaft operative upon said first named rock shaft, a crank carried thereby, an electro-receptive device operative upon said rock shaft through said crank, circuit controlling means whereby said electro-receptive device may be energized and de-energized, and a remote electrical control mechanism temporarily supplying current to said circuit controlling means.

2. A projector for cinematographic targets embodying therein a film feeding mechanism including a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, means common to and simultaneously operative upon all of said driven members, friction washers engageable by said sprockets as said clutch members are disengaged, electrically actuated means operative upon said last named means, circuit controlling means whereby said electrically actuated means may be energized and de-energized, and a remote electrical control mechanism temporarily supplying current to said circuit controlling means.

3. A projector for cinematographic targets embodying therein a film feeding mechanism including a plurality of driving shafts, a spool having sprocket teeth thereon engageable with a film idly mounted upon each of said shafts, a driven member slidably mounted upon and rotatable with each of said driving shafts, clutch members carried by said driven members and said spools, whereby said spools may be connected with, or disconnected from, the driving shafts upon which they are mounted, a reciprocatory member carried by each of said driving shafts, connections between each reciprocatory member and the driven member mounted upon the driving shaft, a rock shaft, tappets thereon engageable with said reciprocatory members respectively, a spring acting upon each driven member and its associated reciprocatory member biased to engage said clutch members, a spring operative upon said rock shaft biased to disengage said tappets from said reciprocatory members respectively, electrically actuated means operative upon said rock shaft, circuit controlling means whereby said electrically actuated means may be energized and de-energized, and a remote electrical control mechanism temporarily supplying current to said circuit controlling means.

4. A projector for cinematographic targets embodying therein a film feeding mechanism including a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, a reciprocatory member carried by each of said driving shafts, connections between each reciprocatory member and the driven member mounted upon the driving shaft, a frame having bearings, a rock shaft mounted in said bearings, tappets thereon engageable with said reciprocatory members respectively, a spring acting upon each driven member and its associated reciprocatory member biased to engage said clutch members, one of said tappets having a forked end straddling part of said frame, a spring seated between one of the arms of said tappet and part of said frame and biased to rock said shaft to disengage said tappets from said reciprocatory members respectively, and the other arm of the forked end of said tappet limiting movement of said rock shaft by said last named spring, electrically actuated means operative upon said rock shaft, circuit controlling means whereby said electrically actuated means may be energized and de-energized, and a remote electrical control mechanism temporarily supplying current to said circuit controlling means.

5. A projector for cinematographic targets embodying therein a film feeding mechanism including a casing for a supply roll of film, a reel upon which said film is mounted, a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, a reciprocatory member carried by each of said driving shafts, connections between each reciprocatory member and the driven member mounted upon the driving shaft, a rock shaft, tappets thereon engageable with said reciprocatory members respectively, a spring acting upon each driven member and its associated reciprocatory member biased to engage said clutch members, a brake drum carried by said reel, brake arms mounted upon said casing and co-operating with said brake drum, a bell crank lever mounted upon one of said brake arms, a link connection between an arm of said bell crank lever and the other brake arm, a second rock shaft operative upon said first named rock shaft, cranks carried thereby, a link connecting one of said cranks with an arm of said bell crank lever, an electro-receptive device operative upon said rock shaft through the other of said cranks, circuit controlling means whereby said electro-receptive device may be energized and de-energized, and a remote electrical control mechanism temporarily supplying current to said circuit controlling means.

6. A projector for cinematographic targets embodying therein a lamp house, film framing means, a film feeding mechanism including therein a driving shaft, film feeding means idly mounted in relation to said shaft, a driven member carried by and rotatable with said shaft, a clutch mechanism whereby said film feeding means may be connected with, or disconnected from, said driving shaft, means operative upon said clutch mechanism, a pivotally supported color filter screen adapted to be moved into and out of the path of light rays passing from said lamp house to said film framing means, a rock shaft, a crank carried thereby acting upon said color filter screen, a second crank carried thereby operative upon the means operating said clutch mechanism, an electro-receptive device operative upon said rock shaft, circuit controlling means whereby said electro-receptive device may be energized and de-energized, and a remote electrical control mechanism temporarily supplying current to said circuit controlling means.

7. A projector for cinematographic targets embodying therein a lamp house, film framing means, a film feeding mechanism including a casing for a supply roll of film, a reel upon which said film is mounted, a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, a reciprocatory member carried by each of said driving shafts, connections between each reciprocatory member and the driven member mounted upon the driving shaft, a rock shaft, tappets thereon engageable with said reciprocatory members respectively, a spring acting upon each driven member and its associated reciprocatory member biased to engage said clutch members, a brake drum carried by said reel, brake arms mounted upon said casing and cooperating with said brake drum, a bell crank lever mounted upon one of said brake arms, a link connection between an arm of said bell crank lever and the other brake arm, a pivotally supported color filter screen adapted to be moved into and out of the path of light rays passing from said lamp house to said film framing means, a second rock shaft, cranks carried thereby, a link connecting one of said cranks with an arm of said bell crank lever, an electro-receptive device operative upon said rock shaft through another of said cranks, a pivotal connection between another crank of said second rock shaft and said pivotally supported color filter screen and another crank operative upon the rock shaft carrying said tappets, circuit controlling means whereby said electro-receptive device may be energized and de-energized, and a remote electrical control mechanism temporarily supplying current to said circuit controlling means.

8. A projector for cinematographic targets embodying therein a film feeding mechanism including a plurality of driving shafts, a sprocket idly mounted upon each of said shafts, a driven member slidably mounted upon and rotatable with each of said driving shafts, clutch members carried by said driven members and said sprockets, whereby said sprockets may be connected with, or disconnected from, the driving shafts upon which they are mounted, a reciprocatory member carried by each of said driving shafts, connections between each reciprocatory member and the driven member mounted upon the driving shaft, a film rewind casing having a movable cover, a pivotally mounted frame having bearings secured to said cover, a rock shaft mounted in said bearings, tappets thereon engageable with said reciprocatory members respectively, a spring acting upon each driven member and its associated reciprocatory member biased to engage said clutch members, one of said tappets, having a forked end straddling part of said frame, a spring seated between one of the arms of said tappet and part of said frame and biased to rock said shaft to disengage said tappets from said reciprocatory members respectively, and the other arm of the forked end of said tappet limiting movement of said rock shaft by said last named spring, electrically actuated means operative upon said rock shaft, circuit controlling means whereby said electrically actuated means may be energized and de-energized, and a remote electrical control mechanism temporarily supplying current to said circuit controlling means.

9. A projector for cinematographic targets embodying therein a film feeding mechanism including therein a driving shaft, means idly mounted in relation to said shaft, means thereon adapted to engage and impart feeding movement to a film, a driven member carried by and rotatable with said shaft, a clutch mechanism whereby said idly mounted means may be connected with, or disconnected from, said driving shaft, means operative upon said clutch mechanism, electrically actuated means operative upon said last named means, circuit controlling means including therein a remote control circuit including a momentarily operative switch and a relay, a timing mechanism operative on said relay, a local circuit including said electrically actuated means and a normally open electrically actuated controlling switch, an intermittently operative switch for actuating said controlling switch, means maintaining the circuit including said electrically actuated means closed while said timing mechanism is operative, an electro-receptive device in series with said last named means, said intermittent switch and contacts of said relay, whereby the circuit to said electrically actuated means is opened by the operation of said relay as determined by said timing mechanism and said intermittently operative switch.

10. A projector for cinematographic targets embodying therein a film feeding mechanism including therein a driving shaft, means idly mounted in relation to said shaft, means thereon adapted to engage and impart feeding movement to a film, a driven member carried by and rotatable with said shaft, a clutch mechanism whereby said idly mounted means may be connected with, or disconnected from, said driving shaft, means operative upon said clutch mechanism, electrically actuated means operative upon said last named means, circuit controlling means including a remote control circuit including a momentarily operative switch and a relay having two pairs of fixed contacts and a movable contact alternately engageable with said fixed contacts, a timing mechanism operative on said relay, a local circuit having three branches, one of which includes said electrically actuated means and the contacts of a normally open controlling switch, another of which includes an electro-receptive device for actuating said controlling switch, an intermittently operative switch for actuating said controlling switch, and one pair of contacts of said relay, and the third of which includes the other pair of contacts of said relay, means for maintaining said first named branch circuit closed independently of said electrical circuits, an electro-receptive device operative thereon and said intermittently operative switch.

11. A projector for cinematographic targets embodying therein a film feeding mechanism including therein a driving shaft, means idly mounted in relation to said shaft, means thereon adapted to engage and impart feeding movement to a film, a driven member carried by and rotatable with said shaft, a clutch mechanism whereby said idly mounted means may be connected with, or disconnected from, said driving shaft, means operative upon said clutch mechanism, electrically actuated means including a solenoid operative upon said last named means, circuit controlling means including therein a remote control circuit including a momentarily operative switch and a relay having two pairs of fixed contacts, and a movable contact alternately engageable with said fixed contacts, a timing mechanism operative on said relay, a local circuit having three branches, one of which includes said solenoid and the contacts of a normally open controlling switch, another of which includes an electro-receptive device for actuating said controlling switch, a rotary switch mechanism and one pair of contacts of said relay, and the third of which includes the other pair of contacts of said relay, means for maintaining said first named branch circuit closed independently of said electrical circuits, an electro-receptive device operative thereon and said rotary switch.

12. A projector for cinematographic targets embodying therein a film feeding mechanism including therein a driving shaft, means idly mounted in relation to said shaft, means thereon adapted to engage and impart feeding movement to a film, a driven member carried by and rotatable with said shaft, a clutch mechanism whereby said idly mounted means may be connected with, or disconnected from, said driving shaft, means operative upon said clutch mechanism, electrically actuated means including a solenoid operative upon said last named means, a rotary switch member having electro-conductive and electro-non-conductive portions moving in synchronism with said film feeding mechanism, and brushes co-operating therewith, an oscillatory lever, a controlling magnet operative thereon, a latch member co-operating with said lever, an electro-magnet operative thereon, a flexible contact engageable by said latch member, circuit controlling means including a relay having two pairs of fixed contacts, and an oscillatory lever alternately engageable with said pairs of contacts, a timing mechanism operative on said lever, a remote control circuit including said relay and a momentarily operative switch, a local circuit having three branches, one of which includes said solenoid, a pair of fixed contacts and said first named lever, another of which includes said controlling magnet, said rotary switch and one pair of contacts of said relay, and the third of which includes the other pair of contacts of said relay, said electro-receptive device operative upon said latch member, the brush co-operating with said latch member and said rotary switch.

IRVING F. MANDELL.